United States Patent [19]

Breno et al.

[11] 4,210,623

[45] Jul. 1, 1980

[54] FLUID COLLECTION APPARATUS

[75] Inventors: Philip J. Breno, Oregon; Robert N. Clark, Sylvania; Frank E. Semersky, Toledo, all of Ohio

[73] Assignee: Owens-Illinois, Inc., Toledo, Ohio

[21] Appl. No.: 901,948

[22] Filed: May 1, 1978

[51] Int. Cl.² .......................... B01D 33/00; B01L 3/00

[52] U.S. Cl. .................................... 422/101; 141/330; 210/359; 210/444; 210/DIG. 23

[58] Field of Search ................ 422/101; 210/359, 444, 210/DIG. 23; 128/2 F, 272, DIG. 5; 141/327, 330

[56] References Cited

U.S. PATENT DOCUMENTS

| | | | |
|---|---|---|---|
| 3,586,064 | 6/1971 | Brown et al. | 141/330 X |
| 3,661,265 | 5/1972 | Greenspan | 210/359 |
| 3,687,296 | 8/1972 | Spinosa et al. | 128/2 F X |
| 3,693,804 | 9/1972 | Grover | 210/359 |
| 3,837,376 | 9/1974 | Brown et al. | 141/330 X |
| 3,850,174 | 11/1974 | Ayres | 128/272 |
| 3,873,449 | 3/1975 | Connelly et al. | 422/101 X |
| 3,875,012 | 4/1975 | Dorn et al. | 210/DIG. 23 X |
| 3,931,815 | 1/1976 | Takatsuki | 128/2 F |
| 3,954,614 | 5/1976 | Wright | 210/359 X |
| 3,955,423 | 5/1976 | Ohringer | 210/DIG. 23 X |
| 3,970,565 | 7/1976 | Ahlstrand et al. | 210/DIG. 23 X |
| 3,983,037 | 9/1976 | Lee et al. | 210/DIG. 23 X |
| 4,057,499 | 11/1977 | Buono | 210/359 X |

*Primary Examiner*—Joseph Scovronek
*Attorney, Agent, or Firm*—J. R. Nelson; M. E. Click; D. H. Wilson

[57] ABSTRACT

A fluid collection apparatus is disclosed which is useful in separating blood serum or plasma from blood cellular and particulate matter. The apparatus includes an elongate hollow body having a self-sealing septum sealingly disposed within one end thereof and a piston having an axially projecting hollow piercing element adapted to pierce the septum and provide communication with the interior of the hollow body. The piston includes a laterally extending flange for sealing engagement with the interior of a container for containing the mixture to be treated. After the hollow body and the associated piston assembly is inserted into the container the flange of the piston is engaged with the inner wall of the container causing the composite piston apparatus to remain in and seal a sample within the container.

12 Claims, 6 Drawing Figures

FLUID COLLECTION APPARATUS

BACKGROUND OF THE INVENTION

1. Field of the Invention

The present invention relates to an apparatus for the separation of mixtures and is particularly useful in separating a fluid from a solid contained therein. The apparatus is well suited for the separation of blood plasma or serum from the blood cellular and particulate matter phase. In many laboratory and clinical situations, it is desired to separate a solid or semi-solid fraction of a mixture from a liquid fraction of the mixture. This may be accomplished in a number of fashions, with one of the most efficient being the use of an apparatus which is inserted into a sample containing tube to physically separate the liquid from the solid fraction of the mixture. The present invention provides such an apparatus which is capable of separating the liquid from the solid fraction of a mixture by the insertion of the apparatus into a sample containing tube. After the separation has been effected, a self-sealing portion of the apparatus is withdrawn from the sample containing tube as a contamination free, shippable container having the sample of the liquid collected contained therein. Remaining behind in the collection tube is the piston member which effectively seals the sample containing tube, providing a contamination free, sealed disposal means for the contaminating solid contained in the sample containing tube.

2. Description of the Prior Art

As is well known, the market place is replete with fluid separators, many of which are adapted to specialized purposes and useable only for those purposes. U.S. Pat. No. 3,586,064 shows an apparatus for the collection of blood wherein a hollow central body is closed at both ends by pierceable elastomeric seals. The seals are pierced by respective needles, so that when the device is inserted into a collection tube, one of the needles allows the liquid to flow into the interior of the hollow tube, while the other needle provides a vent to atmosphere. When sufficient sample has been collected, the atmosphere vent needle is withdrawn and the septum seals itself. Thereafter, the apparatus is withdrawn from the collection tube and the second needle is withdrawn, providing a self-sealing container for the collected sample.

U.S. Pat. No. 3,837,376 shows a similar apparatus wherein both ends of the collecting apparatus are exposed to the atmosphere while the liquid sample is being forced into the collection apparatus, but in this case, only one needle is used whereby the needle has two vents to be disposed within the interior of the collection apparatus. During the collection operation, liquid flows from the sample containing tube through the needle, into the hollow body through the lower one of the two vents. After the fluid has been collected in the lower portion of the collection apparatus, both ports are again free of fluid and atmospheric communication through the needle vents is established with the interior of the sample containing tube. This facilitates the removal of the collection apparatus from the sample containing tube without interference of so-called vacuum lock problems.

A similar device is shown in U.S. Pat. No. 3,983,037 wherein a flexible walled hollow tube, closed at both ends, is penetrated at one end by a needle-like structure. The end of the needle-like structure which terminates inside the collection apparatus is attached to a filter so that fluid passing through the needle-like structure from the sample containing tube is filtered before it passes into the interior of the collection apparatus. To employ this device, the collection apparatus is compressed to form a partial vacuum on the interior. The needle-like portion protruding from the closed end of the collection apparatus is inserted under the surface of the fluid to be collected, and the pressure on the collection apparatus is released, thereby causing the fluid in the sample containing tube to be drawn up into the needle, passed through the filter, and be collected on the interior of the collection apparatus.

U.S. Pat. No. 3,693,804 shows a pressure differential sampling device wherein the collection apparatus consists of a hollow body portion having one end closed by a piston filter assembly wherein a filter is fitted within a piston structure, and the piston filter structure is fitted within the hollow body of the collection apparatus. To employ the device, the assembly is forced into a sample containing tube so that the liquid is forced through the filter device into the interior of the hollow body portion of the collection apparatus. When sufficient sample has been collected, the collection apparatus is tilted sharply within the sample containing tube to break the seal therebetween and allow withdrawal of the entire apparatus.

In a similar device, U.S. Pat. No. 4,057,499, shows a blood collection apparatus comprising a hollow body tube having a piston member inserted into one end thereof. The piston member is generally bell-shaped with the narrowest portion of the bell structure being inserted into the hollow-body member. The piston contains a filter member through which passes fluid to be collected. In the upper end of the bell-shaped piston member is a one-way valve which allows the fluid to flow through the filter material and into the interior of the hollow body member of the collection apparatus. The composite piston member has a laterally extending flange which sealingly engages the interior wall of the sample containing tube while the collection apparatus is being forced into the sample tube to collect the fluid contained therein. Upon withdrawal of the entire collection apparatus, the flange of the piston folds over itself so that an upper radially grooved portion of the flange moves from its up position into a downward position, thereby breaking the seal between the flange member and the interior walls of the sample containing tube.

Many related fluid collection devices are known. For example, see U.S. Pat. Nos. 3,687,296, 3,850,174, 3,875,012 and 3,931,815.

SUMMARY OF THE INVENTION

A number of problems have been evident in these prior art devices. One of the major problems is that when the collection apparatus is withdrawn from the sample containing tube, the bottom of the collection apparatus is contaminated with the material contained in the tube. This material, especially in medical circumstances, may contain pathogens or toxins which should not be exposed to the laboratory environment. Additionally, another major problem exists in that the removal of the collection apparatus leaves an open sample containing tube which is similarly disadvantageous from a contamination or spillage standpoint in a laboratory.

The instant invention contemplates a fluid collection apparatus for the separation of a mixture including an elongate, thin walled, transparent, hollow body member which is closeable at both ends. Disposed at one end of the hollow body is a self-sealing septum. Disposed adjacent the septum is a closure means which includes a composite piston member having a laterally extending flange portion of a greater diameter than the diameter of the hollow body so that the flange portion extends past the outer edge of the hollow body. A central passageway extends through the body of the composite piston and allows communication with piercing means on the innermost end of the composite piston. Disposed within the central passageway is a filter element to effectively prohibit the passage of solid material which is mixed with the fluid fraction in the mixture from passing into the interior space in the hollow body. The composite piston member is configured so that it will be maintained as part of the hollow body assembly while the collection apparatus is being inserted into a sample collection tube. As the collection apparatus is forced into the sample collection tube, fluid in the mixture is forced through the filter element contained in the passage means and is vented to the interior of the hollow body. When sufficient sample has been collected, the path of travel of the collection apparatus is reversed. Upon such reversal, the composite piston assembly detaches itself from the collection apparatus by withdrawing the piercing means through the self-sealing septum and remaining behind in the sample containing tube with the composite piston. This composite piston assembly effectively seals the sample containing tube so that no contaminating material is exposed to the laboratory. The septum contained within the hollow body seals itself upon removal of the piercing means, typically a needle, from it, and thereby seals at one end the collected fluid within the hollow body. The other end of the hollow body is then sealed by closure means, such as a snap-on cap, to form a shippable, contamination free fluid collection apparatus, according to the present invention. It is an object of the present invention to provide an apparatus for the collection of fluids in a mixture which is of simple and sturdy design, which can be inserted into a sample containing tube, and which can be withdrawn without contaminating the exterior portion of the apparatus.

Another object of the present invention is to provide a simple, reliable apparatus which is useful not only for the collection of a sample in a non-contaminated container, but also contains means to seal the sample containing tube and thereby maintain any contaminating or hazardous materials therein.

A further object of the present invention is to provide an apparatus which is very simple in design and composed of minimal parts which can be reaily and economically manufactured and assembled.

BRIEF DESCRIPTION OF THE DRAWINGS

The above objects and advantages will become readily apparent to one skilled in the art from reading the following detailed description of the present invention, when considered in light of the accompanying drawings, in which.

DETAILED DESCRIPTION OF THE INVENTION

Figure 1:
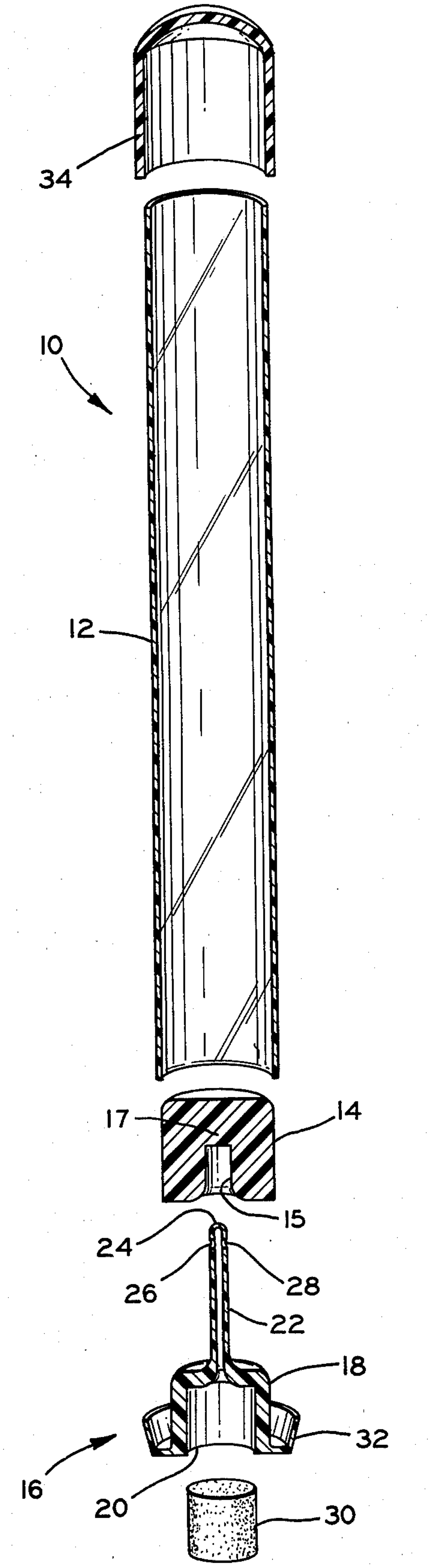
FIG. 1 is an exploded sectional perspective view of a fluid collection apparatus embodying the salient features of the present invention.
Figure 2:
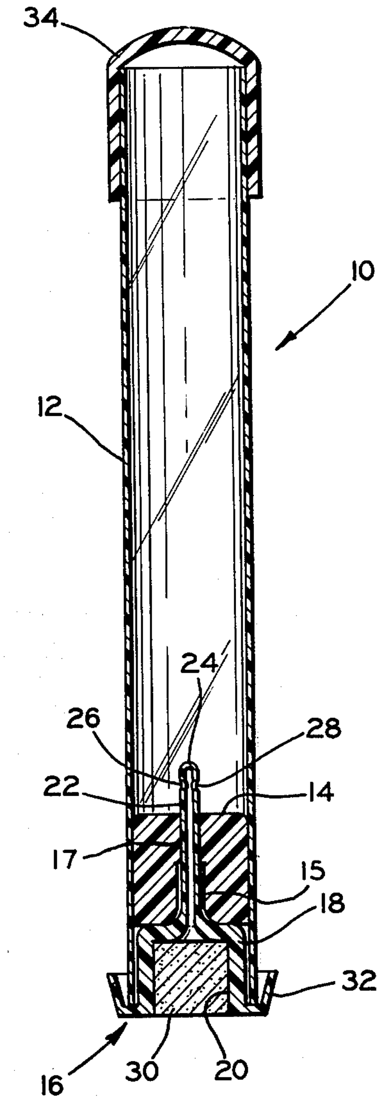
FIG. 2 is an enlarged sectional view of the assembled fluid collection apparatus illustrated in FIG. 1.

Referring to FIGS. 1 and 2, the present invention is embodied in an apparatus for the collection of a fluid contained in a mixture, usually a liquid and a solid. The apparatus is well suited for the separation of blood plasma or serum from the cellular and particulate phase of centrifuged blood. There is shown a fluid collection apparatus 10 in the form of an elongate, thin walled, transparent, hollow body 12. A septum 14 is adapted to be inserted into one end of the hollow body 12. The septum 14 is typically cylindrical in shape and formed of a self-sealing plastic or rubber material. The septum 14 may be provided with an internally formed cavity 15 closed at the inner end thereof by a web portion 17. A composite piston 16 is formed to fit into the hollow body 12 and abut the septum 14. The composite piston 16 includes a unitary body 18 having at its outermost face a central passageway 20 which extends through most of the length of the unitary body 18 and terminates at the point of beginning of piercing means 22. The piercing means 22 is usually a plastic or steel needle. In the embodiment shown in FIGS. 1 and 2, the piercing means 22 is in the form of a hollow plastic needle which is blunt-nosed at the distal end 24. Along the length of the piercing means 22 and immediately below the distal end 24 are two vents 26 and 28 which allow fluid flow into the hollow body 12 from the exterior of the apparatus. A filter element 30 is disposed within the central passageway 20. The filter element 30 is usually a porous, plastic plug which restricts the flow of a solid through the central passageway 20 and piercing means 22 and into the interior of the hollow body 12, but will allow fluid flow through the same path. The outermost end of the composite piston 16 includes a peripherally extending flange 32 which serves to sealingly engage the inner walls of a sample containing tube into which the fluid collection apparatus 10 is inserted, as will be described in detail hereinafter. A snap-on closure 34 is formed to close the uppermost or first end of the hollow body 12 and is removed to employ the apparatus 10.

As shown in FIG. 2, the apparatus 10 is closed at one end by placing the snap-on closure 34 on the uppermost end of the apparatus 10. The filter element 30 is formed so that it will fit snugly within the central passageway 20. Alternatively, the filter element 30 may be secured in the central passageway 20 with a suitable adhesive. Usually, the piercing means 22 is integral with the unitary body 18 of the composite poston 16. When the piercing means 22 is formed of a plastic material, the entire composite piston 16, except for the filter element 30, can be formed in a single mold in a one step molding operation. After the filter element 30 is secured within the central passageway 20, the entire composite piston assembly 16 is typically inserted into the lowermost end of the hollow body 12 and pushed inwardly until the uppermost end of the composite piston 16 abuts the lowermost face of the septum 14. The piston 16 is formed so that the uppermost surface of the flange 32 engages the lowermost portion of the hollow body 12. The piercing means 22 penetrates and passes through the cavity 15 and the web portion 17 of the septum 14 and provides fluid communication between the exterior and the interior of the hollow body 12.

In the embodiment of the invention shown in FIGS. 1 and 2, the septum 14 can be pre-pierced to facilitate the insertion of the blunt-nosed plastic needle. Also, the flange 32 is beveled in shape to facilitate insertion of the apparatus 10 into a sample containing tube and to maintain the composite piston 16 in an upright position in the sample containing tube.

Figure 3A:
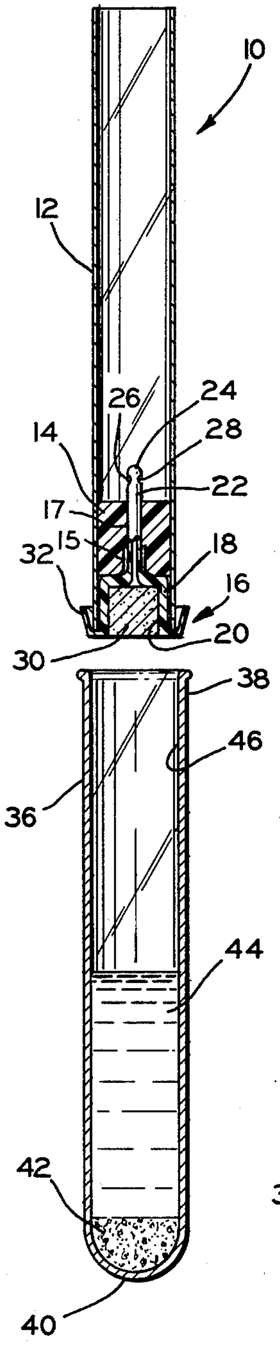
FIGS. 3*a* through 3*c* illustrate a schematic representation of the steps necessary to operate the apparatus illustrated in FIGS. 1 and 2.
Figure 3B:
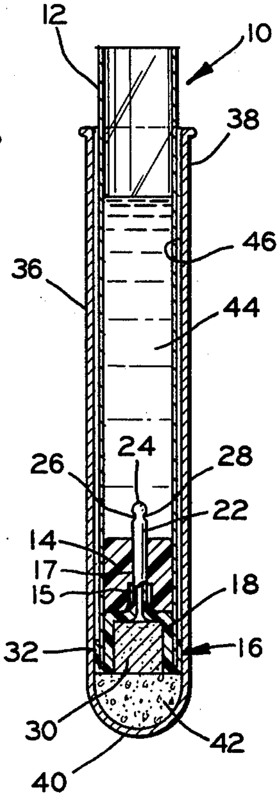
Figure 3C:
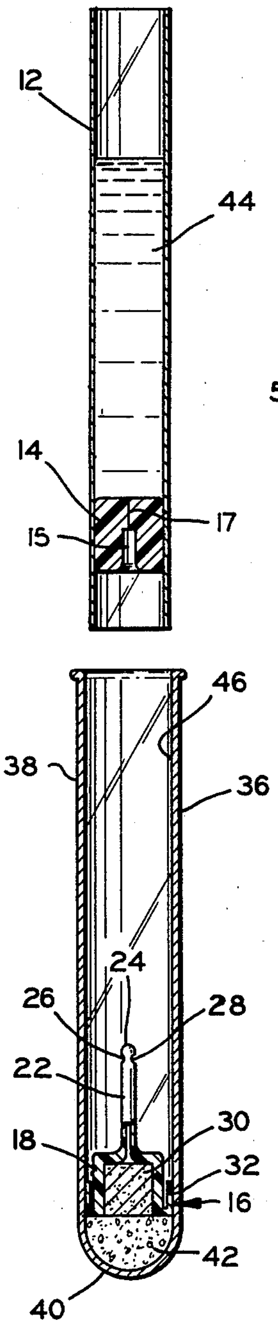

FIGS. 3*a* through c show the steps necessary to utilize the invention described in FIGS. 1 and 2.

In FIG. 3*a*, there is shown the assembled fluid collection apparatus 10 having the hollow body 12, the composite piston 16, with its unitary body 18, piercing means 22, flange 32 and filter element 30. The apparatus 10 is inserted into a sample containing tube 36, having an open end 38, a closed end 40, and a mixture contained therein comprising a solid fraction 42 and a fluid fraction 44. FIG. 3*a* shows the apparatus 10 poised just above the sample containing tube 36, ready to be inserted therein. As the apparatus 10 is inserted into the sample containing tube 36, the flange 32 of the composite piston 16 engages the inner wall 46 of the open end 38 of the sample containing tube 36. As the apparatus 10 is forced downwardly into the bore of the sample containing tube 36, the fluid 44 therein is forced through the filter element 30 and through the piercing means 22 and is collected as it flows from the vents 26 and 28 on the piercing means 22 into the hollow body 12.

After the fluid 44 is collected, the path of travel of the apparatus 10 is reversed. The piercing means 22 is withdrawn from the septum 14 due to the flange 32 being securely engaged to the inner wall 46 of the sample containing tube 36. The withdrawal of the hollow body 12 causes the web portion 17 of the septum 14 to automatically seal and thereby form a self-sealed fluid container, the outer surface of which is essentially contamination free due to the fact that no part of the exterior surface of the hollow body 12 or septum 14 has come in contact with any fraction of the solid 42 which may be a contaminant.

After the hollow body 12 and septum 14 portion of the assembly 10, is withdrawn from the tube 36, the composite piston 16, due to the flange 32 engaging the inner wall 46 of the tube 36, remains behind to seal the solid 42 within the tube 36. This forms a contamination free disposal vessel for the disposal of the solid. Many times the solid is a biological fluid, such as blood solids for example, which may contain contaminating materials which one would not want to be exposed to in the laboratory.

Figure 4:
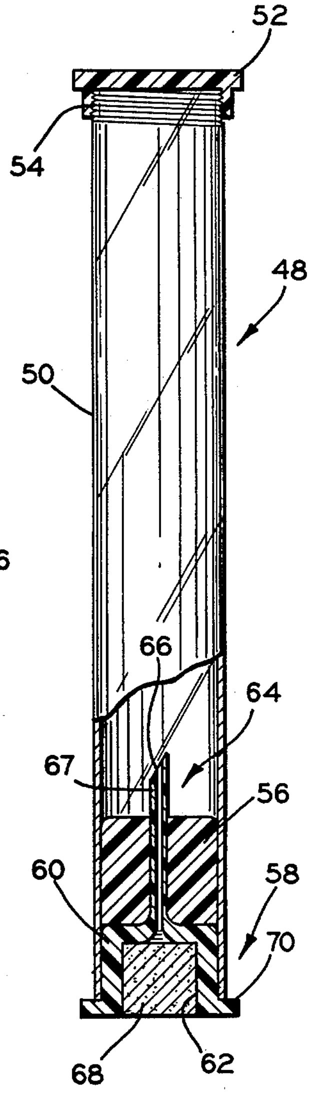
FIG. 4 is an elevational, partially sectional view of a modified form of the apparatus illustrated in FIGS. 1 and 2.

Another embodiment of the invention is shown in FIG. 4. The apparatus 48 embodied in FIG. 4 has an elongate, thin walled, transparent, hollow body 50 which is closed at its uppermost end by a screw type closure 52, having the closure 52 fitted with internal threads to engage external threads 54 on the exterior surfaces of the uppermost end of the hollow body 50. A setum 56 is disposed proximate the lowermost end of the hollow body 50. The septum 56 is formed of a self-sealing material, to be described in detail hereinafter. A composite piston 58 is also fitted into the lowermost portion of the hollow body 50. The composite piston 58 comprises a unitary body 60 having a central passageway 62 extending therethrough. At the uppermost end of the composite piston is piercing means 64 which is adapted to pierce the septum 56. Communication between the exterior and the interior of the hollow body 50 is provided through the hollow bore 66 and the central passageway 62. The piercing means 64 is usually a metal needle in this embodiment, with a rigid hollow body 67 and an internal hollow bore 66. A filter element 68 is disposed within the central passageway 62 of the composite piston 58, and a flange 70 extends from the unitary body 60.

The invention embodied in FIG. 4 differs from the invention embodied in FIGS. 1 and 2 in that the closure means 52 at the uppermost end is a threaded closure means; the flange 70 is not beveled; and the piercing means 64 is a stainless steel needle with a single bore 66, not a pair of side vents like 26 and 28.

In the preferred embodiment shown in FIGS. 1 and 2, the hollow body 12 is clear, rigid material such as a plastic or glass. A plastic is preferred and cellulose acetate butyrate tubes having an outside diameter of 11 millimeters, an inside diameter of 10 millimeters and a length of about 100 millimeters have proved satisfactory. The septum 14 is made of a self-sealing elastomeric material such as silicone rubber. The filter element 30 is a porous, plastic material which is dimensionally stable and rigid so that it may be formed into a cartridge shape to be inserted into the central passageway 20.

Generally, a 50 micron average pore size is adequate for use with most samples of biological origin. The pore size of the filter element 30 may be adjusted to meet any sample characteristics so long as the material meets the dimensional stability and compatability requirements above.

The composite piston body 18 is made of a rigid, dimensionally stable plastic, such as polyethylene. The snap-on closure 34 is also of a plastic but usually a flexible plastic like vinyl plastisol. When a plastic needle is employed as the piercing means 22, usually it is formed as an integral part of the unitary body 18 and is thus of the same composition, in this case polyethylene.

In the case of the invention embodied in FIG. 4, the screw type closure 52 is of a plastic composition, typically a rigid polyethylene. The piercing means 64 is a metal needle, usually stainless steel. All other components are the same as those specified for the preferred embodiment shown in FIGS. 1 and 2.

The septum 56 in the embodiment shown in FIG. 4 need not be pre-pierced or have a cavity and web construction, since the metal needle used easily pierces the septum 56. Also, it is to be recognized that, the plastic needle need not have two side vents 26 and 28, one will serve well in the apparatus. The two vent configuration does show the advantage of being more easily molded than does the single side vent configuration.

In any case, other suitable materials may be used so long as they conform to any standards needed in regard to rigidity, dimensional stability, or chemical inertness to the sample. For example, the snap-on closure is usually made of a flexible vinyl plastisol but could also be made of a flexible polyethylene should the needs of the user require. Since the apparatus may be readily employed to separate a reaction precipitate from a reaction supernatant fluid, solvent resistant plastic, glass, or metal components may be used where needed.

The apparatus of the invention is well suited to the separation of the liquid or fluid fraction of blood from the solid or semi-solid fraction thereof. In such use, the blood to be sampled must be initially subjected to centrifugation. If the apparatus is used with whole blood, some cellular debris or whole cells may pass through the filter element and be collected along with the fluid fraction of the sample. Typically, whole blood is placed in a sample containing tube and centrifuged to precipitate the blood solids from the supernatant fluid. The fluid is plasma, if an anticoagulant is added; and the cellular matter is simply precipitated. The fluid is serum when no anticoagulant is added and a unitary clot is formed as the semi-solid precipitate. In either case, the whole blood is typically centrifuged prior to the use of the apparatus.

An important feature of the invention is that essentially only the lowermost face of the composite piston 16 and the interior surfaces of the closure 34, the hollow body 12, and the septum 14 are exposed to any contamination from the sample. This results in a relatively clean, contamination free surface for the outer surfaces of the closure 34, the hollow body 12, and the septum 14, and the uppermost portion of the composite piston 16. Therefore, any contaminating matter in the sample is held on the interior of the closure 34, the hollow body 12, and the septum 14, or at the bottom of the sample containing tube which is closed by the composite piston 16 and thereby provides a clean, shippable container for the fluid fraction; and a clean, easily disposable container for the solid fraction of the sample.

While a preferred and alternative embodiment of the present invention has been illustrated and described, it is understood that various modifications may be resorted to without departing from the scope of the appended claims.

What we claim is:

1. A fluid collection apparatus for collecting fluid from a mixture of a fluid and a particulate located in a container comprising:

an elongate, hollow body insertable in the container and having a first and a second open end;

detachable closure means for said first end;

a self-sealing septum sealingly disposed within said body adjacent said second end; and a composite piston slidably insertable into said second end of said hollow body, said piston having an annular body defining a central passageway therethrough, an axially projecting hollow piercing element adapted to pierce said septum and provide communication between said central passageway and the interior of said hollow body, a filter element disposed within said central passageway, and means on said piston for sealingly engaging the interior wall of the container, said means including a laterally extending flange extending beyond the outer wall of said hollow body whereby when the apparatus is inserted into the container, the fluid of the mixture is caused to pass through said filter element, said hollow piercing means, and thence into the interior of said hollow body, and when the apparatus is withdrawn from the container, the laterally extending flange maintains said composite piston in the container.

2. The apparatus of claim 1 wherein said hollow body is of a plastic composition.

3. The apparatus of claim 2 wherein said plastic is cellulose acetate butyrate.

4. The apparatus of claim 1 wherein said self-sealing septum is of a silicone rubber.

5. The apparatus of claim 1 wherein said composite piston is of a plastic composition.

6. The apparatus of claim 5 wherein said plastic is polyethylene.

7. The apparatus of claim 1 wherein said filter element is of a plastic composition.

8. The apparatus of claim 1 wherein said piercing means is a hollow needle.

9. The apparatus of claim 8 wherein said needle is of a plastic composition.

10. The apparatus of claim 8 wherein said needle is of a metal composition.

11. The apparatus of claim 1 wherein said hollow body is a right circular cylinder.

12. The apparatus of claim 11 wherein said composite piston is a right circular cylinder.

* * * * *